(12) United States Patent
Roberts et al.

(10) Patent No.: US 7,676,161 B2
(45) Date of Patent: Mar. 9, 2010

(54) MODULATION E-FIELD BASED CONTROL OF A NON-LINEAR TRANSMITTER

(75) Inventors: Kim Roberts, Nepean (CA); James Harley, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1195 days.

(21) Appl. No.: 11/008,515

(22) Filed: Dec. 10, 2004

(65) Prior Publication Data

US 2006/0127102 A1   Jun. 15, 2006

(51) Int. Cl.
   *H04B 10/00*   (2006.01)
(52) U.S. Cl. ........................................ 398/194; 398/192
(58) Field of Classification Search .......... 398/182–201
See application file for complete search history.

(56) References Cited

U.S. PATENT DOCUMENTS

| 5,148,503 | A | 9/1992 | Skeie |
| 5,301,058 | A | 4/1994 | Olshansky |
| 5,311,346 | A | 5/1994 | Haas et al. |
| 5,349,312 | A | 9/1994 | Huettner et al. |
| 5,408,498 | A | 4/1995 | Yoshida |
| 5,416,626 | A | 5/1995 | Taylor |
| 5,446,574 | A | 8/1995 | Djupsjobacka et al. |
| 5,513,029 | A | 4/1996 | Roberts |
| 5,579,328 | A | 11/1996 | Habel et al. |
| 5,761,225 | A | 6/1998 | Fidric et al. |
| 5,892,858 | A | 4/1999 | Vaziri et al. |
| 5,949,560 | A | 9/1999 | Roberts et al. |
| 5,999,258 | A | 12/1999 | Roberts |
| 6,067,180 | A | 5/2000 | Roberts |
| 6,115,162 | A | 9/2000 | Graves et al. |
| 6,124,960 | A | 9/2000 | Garthe et al. |
| 6,128,111 | A | 10/2000 | Roberts |

(Continued)

FOREIGN PATENT DOCUMENTS

EP    0 524 758    1/1993

(Continued)

OTHER PUBLICATIONS

Adaptive Electronic Linearization of Fiber Optic Links, OFC 2003, vol. 2, pp. 477-480, Mar. 2003 Sadhwani et al.

(Continued)

*Primary Examiner*—Agustin Bello
(74) *Attorney, Agent, or Firm*—Kent Daniels; Blake, Cassels & Graydon LLP

(57) ABSTRACT

In a method of synthesizing an optical signal, a multi-bit digital representation of a desired optical E-field is generated. The multi-bit digital representation has a resolution of N1-bits, where N1 is an integer greater than 2. At least two analog drive signals are synthesized based on the multi-bit digital representation. Each analog drive signal exhibits excursions between $2^M$ discrete states (i.e. has a resolution of M-bits), where M is an integer greater than 2. An electrical-to-optical (E/O) converter is driven using the analog drive signals to generate an output optical E-field at an output of the E/O converter. An error is detected between the output optical E-field and the desired complex E-field waveform, and at least one parameter adjusted so as to minimize the detected error.

80 Claims, 7 Drawing Sheets

U.S. PATENT DOCUMENTS

| | | | |
|---|---|---|---|
| 6,205,262 B1 | 3/2001 | Shen | |
| 6,262,834 B1 | 7/2001 | Nichols et al. | |
| 6,278,539 B1 * | 8/2001 | Ooi et al. | 359/237 |
| 6,304,369 B1 | 10/2001 | Piehler | |
| 6,362,913 B2 * | 3/2002 | Ooi et al. | 359/245 |
| 6,388,786 B1 * | 5/2002 | Ono et al. | 398/183 |
| 6,441,932 B1 | 8/2002 | Helkey | |
| 6,473,013 B1 | 10/2002 | Velazquez et al. | |
| 6,473,214 B1 * | 10/2002 | Roberts et al. | 398/183 |
| 6,522,438 B1 * | 2/2003 | Mizuhara | 398/189 |
| 6,559,994 B1 | 5/2003 | Chen et al. | |
| 6,580,532 B1 | 6/2003 | Yao et al. | |
| 6,592,274 B2 * | 7/2003 | Kahn et al. | 398/141 |
| 6,623,188 B1 * | 9/2003 | Dimmick et al. | 398/182 |
| 6,970,655 B2 * | 11/2005 | Ono et al. | 398/186 |
| 7,068,948 B2 * | 6/2006 | Wei et al. | 398/184 |
| 7,075,695 B2 * | 7/2006 | Gronbach | 359/245 |
| 7,155,134 B2 * | 12/2006 | Azadet | 398/202 |
| 7,190,904 B2 * | 3/2007 | DeCusatis et al. | 398/95 |
| 7,236,707 B2 * | 6/2007 | Shahar | 398/140 |
| 7,317,877 B2 * | 1/2008 | Price | 398/184 |
| 7,330,666 B1 * | 2/2008 | Koley | 398/188 |
| 2001/0028760 A1 | 10/2001 | Yaffe | |
| 2002/0018268 A1 | 2/2002 | Price et al. | |
| 2002/0024694 A1 | 2/2002 | Newell et al. | |
| 2002/0106148 A1 | 8/2002 | Schemmann et al. | |
| 2002/0167693 A1 * | 11/2002 | Vrazel et al. | 359/109 |
| 2003/0011847 A1 | 1/2003 | Dai et al. | |
| 2003/0198478 A1 * | 10/2003 | Vrazel et al. | 398/183 |
| 2004/0081470 A1 * | 4/2004 | Griffin | 398/188 |
| 2006/0127102 A1 * | 6/2006 | Roberts et al. | 398/182 |
| 2007/0092263 A1 * | 4/2007 | Agazzi | 398/188 |
| 2008/0025731 A1 * | 1/2008 | Mahgerefteh et al. | 398/185 |

FOREIGN PATENT DOCUMENTS

| | | |
|---|---|---|
| EP | 0 971 493 | 1/2000 |
| EP | 1 223 694 | 7/2002 |
| EP | 1 237 307 | 9/2002 |
| WO | WO 01/03339 | 1/2001 |
| WO | WO 01/91342 | 11/2001 |
| WO | WO 02/43340 | 5/2002 |

OTHER PUBLICATIONS

Automated Measurement of Polarization Mode Dispersion Using Jones Matrix Eigenanalysis, IEE PhotonicsTechnology Letters, vol. 4, No. 9, pp. 1066-1069, Sep. 1992, Heffner.

Design of Broad-Band PMD Compensation Filters, IEEE Photonics Technology Letters, vol. 14, No. 8, Aug. 2002, A. Eyal et al.

Dispersion Compensation by Active Predistorted Signal Synthesis, Journal of Lightwave Technology, vol. LT-3, No. 4, Aug. 1985, Thomas L. Koch and Rod C. Alferness.

Dispersion Compensation with an SBS-Suppressed Fiber Phase Conjugator Using Synchronized Phase Modulation, OFC 2003, vol. 2, pp. 716-717, M. Tani.

Electrical Signal Processing Techniques in Long-Haul Fiber-Optic Systems, 1990 IEEE-Transactions on Communications, vol. 38, No. 9, Jack H. Winters, et al.

High-Dynamic-Range Laser Amplitude and Phase Noise Measurement Techniques, IEEE Journal on Selected Topics in Quantum Electronics, vol. 7, No. 4, Jul./Aug. 2001, Ryan P. Sc.

Measurement of High-Order Polarization Mode Dispersion, IEEE Photonics Technology Letters, vol. 12, No. 7, Jul. 2000, Yi Li et al.

Mitigation of Dispersion-Induced Effects Using SOA in Analog Optical Transmission, IEEE Photonics Technology Letters, vol. 14, No. 8, Aug. 2002, Duk-Ho Jeon et al.

Performance of Smart Lightwave Receivers With Linear Equalization, Journal of Lightwave Technology, vol. 10, No. 8, Aug. 1992, John C. Cartledge, et al.

Polarization Modulated Direct Detection Optical Transmission Systesm, Journal of Lightwave Technology, vol. 10, No. 12, Dec. 1992.

Predistortion of Electroabsorption Modulators for Analog CATV Systems at 1.55 •m, Journal of Lightwave Technology, vol. 15, No. 9, Sep. 1997, Gordon C. Wilson et al.

Predistortion Techniques for Linearization of External Modulators, 1999 IEEE—Gordon Wilson, Lucent Technologies, NJ 07733, U.S.A.

Representation of Second-Order Polarisation Mode Dispersion, Electronics Letters, vol. 35, No. 19, Sep. 16, 1999, A. Eyal et al.

Soliton Transmission Using Periodic Dispersion Compensation, Journal of Lightwave Technology, vol. 15, No. 10, Oct. 1997, Nicholas J. Smith et al.

Theoretical Basis of Polarization Mode Dispersion Equalization up to the Second Order, Journal of Lightwave Technology, vol. 18, No. 4, Apr. 2000, Teruhiko Kudou et al.

H. Gysel et al. "Electrical Predistortion to Compensate for Combined Effect of Laser Chirp and Fibre Dispersion", Electronics Letters IEE Stevenage vol. 27, No. 5, Feb 1991.

A. Mecozzi et al. "Cancellation of timing and Amplitude Jitter in Symmetric Links Using Highly Dispersed Pulses", IEEE Photonics Technology Letters, vol. 13, No. 5, May 2001.

Ram Sadhwani, Adaptive CMOS Predistortion Linearizer for Fiber-Optic Links, Journal of Lightwave Technology, vol. 21, No. 12, Dec. 2003.

P.S. Andre, et al., "Extraction of DFB Laser Rate Equation Parameters for Optical Simulation Pusposes", Conftele 1999 ISBN 972-98115-0-4.

Lucas Illing, et al., "Shaping Current Waveforms for Direct Modulation of Semiconductor Lasers", Institute for Nonlinear Science, U.C. San Diego, 2003.

P.M. Watts, et al., "Demonstration of Electrical Dispersion Compensation of Single Sideband Optical Transmission", London Communications Symposium 2003, University College Lon.

Hoon Kim, et al., "10 Gbit/s 177 km transmission over conventional singlemode fibre using a vestigial side-band modulation format" Electronics Letters, vol. 37, No. 25 Dec. 6, 2001 pp. 1533-1534.

Henning Bulow, et al., "Dispersion Mitigation Using a Fiber-Bragg-Grating Sideband Filter and a Tunable Electronic Equalizer", Optical Society of America, 2000.

M. Sieben, et al., "10Gbit/s optical single sideband system" Electronics Letters, vol. 33, No. 11, May 22, 1997, pp. 971-973.

Feldhaus G., "Volterra Equalizer for Electrical Compensation of Dispersion and Fiber Nonlinearities", Journal of Optical Communicatinos, Fachverlag Schiele & Schon, Berlin, De, vol. 23, No. 3, Jun. 2002, pp. 82-84, XP001130377, ISSN: 0173-4911.

Kamoto, T. et al "An 8-bit 2-ns Monolithic DAC", IEEE Journal of Solid-State Circuits, Feb. 1988, vol. 23, No. 1.

* cited by examiner

Figure 1b
(PriorArt)
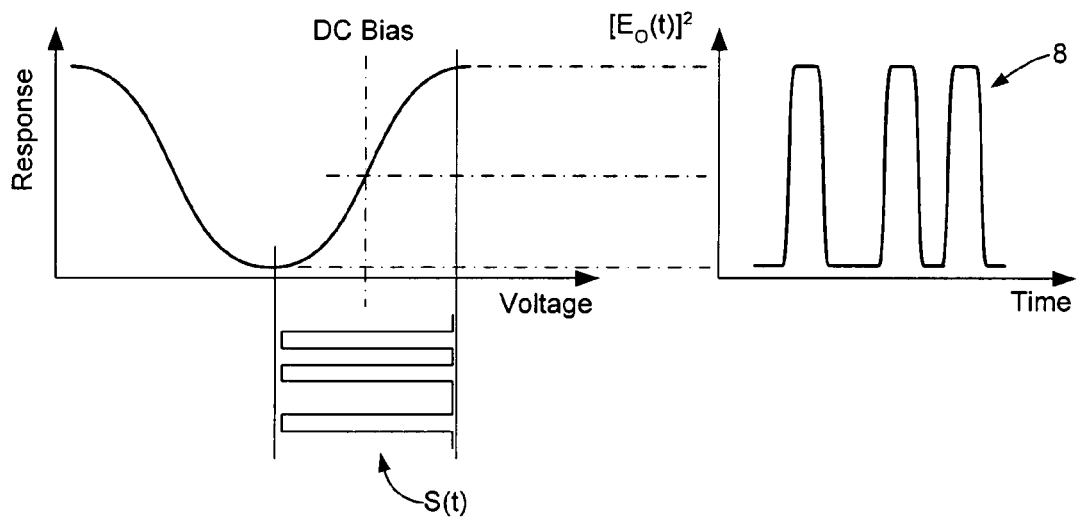
Figure 1c
(PriorArt)
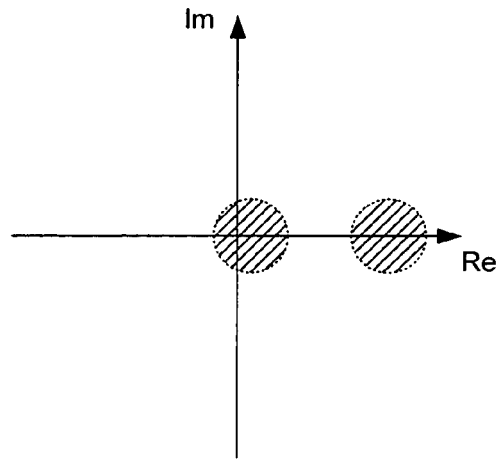

MODULATION E-FIELD BASED CONTROL OF A NON-LINEAR TRANSMITTER

CROSS-REFERENCE TO RELATED APPLICATIONS

This is the first application filed for the present invention.

MICROFICHE APPENDIX

Not Applicable.

TECHNICAL FIELD

The present invention relates to optical signal transmitters for optical communications systems, and in particular to a system and methods for controlling a non-linear optical transmitter.

BACKGROUND OF THE INVENTION

For the purposes of understanding the present invention, it is useful to consider a representation of the total optical E-field E(t) as a vector confined to a plane and emanating from a fixed origin, where the length of the vector gives the amplitude of the E-field at any instant (t), and the direction of the vector gives the phase of the field at any instant (t). Within this construction, we consider two basis sets. The first basis set is a Cartesian coordinate system centered on the E-field origin. In this Cartesian representation, the total E-field E(t) is decomposed along the orthogonal Real (Re) and Imaginary (Im), or, equivalently, In-phase (I) and Quadrature (Q), directions. The second basis set is a polar coordinate system, again sharing its origin with that of the E-field vector. In this polar representation, the E-field is decomposed into vector length (S) and phase angle ($\phi$) relative to the Re-direction. These two basis sets are related by a non-linear transformation, in a manner well known in the art. In each of these representations, the time-sequence of loci of the end-point of the E-field vector may be referred to as a trajectory of the E-field.

In the optical communications space, various techniques are used to synthesize an optical communications signal for transmission. A popular technique utilizes a laser 2 coupled to an external Electrical-to-Optical (E/O) converter 4, as shown in FIG. 1a. The laser 2 generates a narrow-band continuous wave (CW) optical carrier signal 6 having a desired wavelength. The E/O converter 4 operates to modulate the amplitude and/or phase of the carrier signal 6 to generate the optical communications signal 8 based on one or more drive signals S(t) generated by a driver circuit 10 based on an input data signal x(t).

In the arrangement illustrated in FIG. 1a, the E/O converter 4 is provided by a well known Mach-Zehnder (MZ) interferometer. Other types of E/O converters may be used, depending on the desired type of modulation. For example, an electro-absorptive E/O converter (EAM) or a variable optical attenuator (VOA) may be used for amplitude modulation, whereas phase shifters are well known for implementing phase modulation schemes. In each case, the driver circuit 10 generates the drive signals S(t), primarily by scaling the input data signal x(t) to satisfy the voltage and current requirements of the E/O converter 4. In some cases, the input data signal x(t) is encoded in accordance with a desired modulation scheme (e.g. for quadrature encoding), and the resulting encoded data signal scaled to satisfy the voltage and current requirements of the E/O converter 4. The format of the drive signal S(t) output from the driver circuit 10 is principally governed by the desired modulation scheme, and will typically take the form of a baseband (i.e., binary, direct current) signal; a coded (e.g. quadrature encoded) signal; or a modulated electrical (e.g. radio frequency) carrier signal. In addition, each drive signal may also be generated in the form of a differential signal pair ±S(t), which provides certain advantages known in the art. In all cases, the drive signals S(t) are directly modeled on the input data signal x(t), and represent the data to be modulated onto the CW carrier 6. This is true even where an encoding scheme, such quadrature encoding, is used.

For example, FIGS. 1a and 1b illustrate a conventional transmitter in which an input data signal x(t) is transmitted using the well known On-Off Keying (OOK) modulation scheme. As may be seen in FIG. 1a, the driver 10 scales the input data signal x(t) to produce a differential pair of bi-state (that is two-level) baseband drive signals ±S(t). The baseband drive signal pair ±S(t) is then used to drive excursions of the E/O converter's (sinusoidal) amplitude response between maximum and minimum transmittance, as may be seen in FIG. 1b. This operation yields an amplitude-modulated optical communications signal 8 having an optical E-field $E_O(t)$ which exhibits excursions of amplitude between two states reflecting the binary values of each bit of the input data signal x(t), as shown seen in FIG. 1c, in which the optical E-field $E_O(t)$ is represented in the complex Re/Im plane. As may be seen in FIG. 1c, amplitude modulation of the CW carrier 6 in the above manner results in excursions of the optical E-field $E_O(t)$ between loci clustered about two points on the real (Re) axis. Ideally, all of the E-field loci will be located on the real (Re) axis. However, in practice the optical E-field $E_O(t)$ will also exhibit excursions in the imaginary (Im) direction due to phase chirp resulting from coupling of phase and amplitude responses of all real electro-optical devices.

FIG. 1d illustrates an arrangement in which the input data signal x(t) is encoded by an encoder block 12 prior to scaling. Various encoding schemes are known in the art. For example, U.S. Pat. No. 6,522,439 (Price et al), teaches an arrangement in which the input data signal x(t) is split into a pair of parallel In-phase (I) and Quadrature (Q) signal components (i.e. the sine and cosine of the data signal x(t)), which are then modulated onto an electrical (RF) carrier and scaled to yield a corresponding pair of drive signals $S_I(t)$ and $S_Q(t)$. U.S. Pat. No. 5,892,858 (Vaziri et al) teaches another arrangement in which the input data signal x(t) is sampled to generate a duo-binary encoded signal, which is then scaled to generate the drive signal. It is also known to quadrature encode the input data signal x(t) prior to scaling. In this case, the input data signal x(t) is divided into successive 2-bit symbols. The stream is symbols are then supplied to the driver circuit 10, which outputs a quad-state (i.e. four-level) drive signal S(t). Driving the phase response of the E/O converter 4 with the quad-state drive signal S(t) yields a communications signal 8 having an optical E-field $E_O(t)$ which exhibits phase excursions between four discrete states reflecting the binary values of each 2-bit symbol. This is illustrated in FIG. 1e, in which the optical E-field $E_O(t)$ is represented in the complex Re/Im plane. As may be seen in FIG. 1e, quadrature phase shift modulation of the CW carrier 6 in the above manner results in excursions of the E-field E(t) between loci clustered about four points which are roughly symmetrically distributed about the origin. Here again, scatter of the E-field loci is a function of phase and amplitude distortions due to phase/amplitude response coupling.

In addition to data encoding, it is also known to provide various analog electrical signal processing functions in order to modify the drive signals S(t). For example, U.S. Pat. No.

6,522,439 (Price et al.), U.S. Pat. No. 6,574,389 (Schemmann et al.), and U.S. Pat. No. 6,687,432 (Schemmann et al.) teach optical transmitters which compensate chromatic dispersion (or, more generally, odd order distortions) of an optical link by predistorting the drive signals. As shown in FIG. 2, these systems provide a signal distorter 14 between the driver circuit 10 and the E/O converter 4. Thus, the drive signal 10 (in any of baseband, coded, or modulated electrical carrier formats) is supplied to the signal distorter 14 which imposes a dispersive function F[ ] on the drive signal S(t). The resulting distorted drive signal F[S(t)] is then supplied to the E/O converter 4 to generate a predistorted optical communications signal for transmission through the link.

In each of the above-noted patents, the signal distorter 12 is provided by an analog filter circuit (not shown) having a group delay characteristic selected to counteract chromatic dispersion of the link. Multiple filter circuits may be cascaded to compensate some other distortions. For example, Schemmann et al. teach that the (typically squaring response) of an optical receiver can also be precompensated at the transmitter, by means of a suitable filter circuit within the signal distorter 12.

A common characteristic among all of the above-noted predistortion techniques is that analog filter circuits are used to distort an otherwise conventionally generated (and thus conventionally formatted) analog drive signal S(t). The premise is that distorting the drive signal S(t) will suitably distort the optical signal 8 in such a way as to offset distortions due to impairments of the optical link. While this approach is satisfactory for compensating linear distortions (such as chromatic dispersion, and receiver squaring effects) it cannot compensate non-linear impairments such as SPM and four-wave mixing. Quite apart from the limitations inherent to analog filter circuits, all of which are well known, compensation of non-linear distortions is complicated by the fact that all real electro-optical devices (i.e. lasers, E/O converters etc.) exhibit a response in both phase and amplitude to changes in drive voltage (or current). This coupling of phase and amplitude responses means, for example, that any change in drive signal voltage required to produce a desired change in the optical E-field amplitude also produces a transient phase change (chirp), and vise-versa. Further complicating this situation is that the overall system response, in terms of changes in the output optical E-field (amplitude and/or phase) due to changes in drive signal voltage (or current) tends to be highly non-linear. As a result, the prior art techniques for compensating linear distortions (such as chromatic dispersion) by applying a predistortion function F[ ] to the drive signals S(t) typically results in compounding the effects of system non-linearities.

Applicant's co-pending U.S. patent applications Ser. No. 10/262,944, filed Oct. 3, 2002; Ser. No. 10/307,466 filed Dec. 2, 2002; and Ser. No. 10/405,236 filed Apr. 3, 2003, the contents of all of which are hereby incorporated herein by reference, and International Patent Application No. PCT/CA03/01044 filed Jul. 11, 2003 describe techniques for compensating both linear and non-linear impairments in an optical link by using a multi-bit digital signal path to generate the drive signals S(t). Thus, a signal processor 16 receives the input data signal x(t) as an input, and uses a compensation function C[ ] to compute successive multi-bit In-phase and Quadrature values ($E_I(n)$ and $E_Q(n)$, respectively) representing successive loci of the end-point of a desired or target optical E-field vector. A linearizer 18 then uses the multi-bit ($E_I(n)$, $E_Q(n)$) loci to synthesize a pair of multi-bit digital drive signals $V_R(n)$ and $V_L(n)$. The digital drive signals $V_x(n)$, in which x is an index identifying the involved branch of the signal path, are then converted into analog (RF) signals by respective high speed multi-bit Digital-to-Analog Converters (DACs) 20, which are then amplified (and possibly band-pass filtered to remove out-of-band noise) to generate the drive signals $S_x(t)$ supplied to a complex E/O converter 22. The digital drive signals $V_x(n)$ are computed such that the drive signals $S_x(t)$ supplied to the complex E/O converter 22 will yield an optical E-field $E_O(t)$ at the complex E/O converter output 24 that is a high-fidelity reproduction of the target E-field computed by the signal processor 16.

In general, the signal processor 16 is capable of implementing any desired mathematical function, which means that the compensation function C[ ] can be selected to compensate any desired signal impairments, including, but not limited to, dispersion, Self-Phase Modulation (SPM), Cross-Phase Modulation (XPM), four-wave mixing and polarization dependent effects (PDEs) such as polarization dependent loss. In addition, the compensation function C[ ] can be dynamically adjusted for changes in the optical properties of the link, and component drift due to aging. The inherent flexibility of the mathematical function implemented by the signal processor 16 also implies that the signal processor 16 can be placed into a "test" mode, and used to generate ($E_I(n)$, $E_Q(n)$) loci of a desired optical E-field vector independently (or even in the absence) of an input data signal x(t).

The linearizer 18 can also implement any desired mathematical function, and thus can perform signal format conversion (i.e. from Cartesian to polar coordinates); compensate for non-linearities in the signal path between the linearizer 18 and the output 24 of the complex E/O converter 22; and perform various scaling and clipping operations to limit dynamic range requirements of electrical components downstream of the linearizer 18 (principally the DACs 20).

The resolution of each analog drive signal $S_x(t)$ is governed by that of the DACs 20. In general, each DAC 20 has a resolution of M-bits, where M is an integer, which yields excursions of each analog drive signal $S_x(t)$ between $2^M$ discrete levels. It will be noted that M=1 represents a trivial case, in which each analog drive signal $S_x(t)$ is a bi-state signal similar to that produced by the conventional driver circuits described above with reference to FIGS. 1 and 2. In applicant's co-pending U.S. patent applications Ser. No. 10/262, 944, filed Oct. 3, 2002; Ser. No. 10/307,466 filed Dec. 2, 2002; and Ser. No. 10/405,236 filed Apr. 3, 2003, and International Patent Application No. PCT/CA03/01044 filed Jul. 11, 2003, M is greater than 4.

The complex E/O converter 22 will normally be provided as either a conventional dual branch MZ interferometer, or as nested MZ interferometers, as illustrated in FIG. 3. In this latter configuration, the complex E/O converter 22 comprises a dual branch "main" MZ interferometer 26, each branch of which comprises a respective branch MZ interferometer 28R and 28L. Each branch MZ interferometer 28x (again, where x identifies the respective branch) is preferably driven by a respective differential signal pair $\pm S_x(t)$.

Multi-bit digital generation of the drive signals $S_x(t)$ in this manner enables the optical transmitter to synthesize any desired E-field waveform at the output 24 of the complex E/O converter 22. Because the linearizer 18 synthesizes the digital drive signals $V_x(n)$ based on a model of the target optical E-field (as opposed to the data signal being transmitted), it is possible to derive a mathematical representation of the entire data path between the signal processor 16 and the E/O converter output 24, which enables phase and amplitude of the output E-field $E_O(t)$ to be independently controlled, even with significant coupling of phase and amplitude responses of the complex E/O converter 22. This is an operational feature which is simply not possible in prior art transmitters.

An implicit limitation of this technique is that accurate synthesis of a desired optical E-field waveform at the E/O converter output 24 is contingent upon satisfying a number of criteria, including (but not necessarily limited to):

the drive signals $S_x(t)$ must be supplied to respective branches of the E/O converter 22 with substantially zero phase and amplitude error;

generation of the drive signals must take into account the known response of the E/O converter 22, as well as "component drift" due to changes in temperature, and aging; and the E/O converter must be driven to an optimal bias point, which, for the complex E/O converter 22 of FIG. 3, requires optimal bias settings of both branch MZ interferometers 28x, and the main interferometer 26.

In addition to the inherent phase/amplitude response coupling and non-linearity of real electro-optical components, satisfying these criteria is complicated by the fact that each of the devices in the signal paths traversed by the drive signals $S_x(t)$ are subject to manufacturing variations, as well as component drift due to temperature, aging and (in some cases) mechanical stress. As a result, an exact match between the two signal paths is not practicable.

A known method for dynamically controlling an E/O converter 4 of the type described above with reference to FIGS. 1 and 2, is to implement one or more control loops using a dither signal inserted into the drive signal S (t). Typically, such dither signals take the form of a low frequency sinusoidal analog signal that is added to the drive signals S(t), and detected in the optical signal at some point downstream of the E/O converter 4. Differences (typically of amplitude) between the added and detected dither signals provide a direct indication of gain, from which other performance characteristics may be inferred. The frequency of the dither signal is typically selected to be low enough to avoid interference with data traversing the signal path, but high enough to avoid being attenuated by low-frequency cutoff.

However, because of phase/amplitude response coupling, non-linearity and frequency dependence of the complex E/O converter 22, the use of conventional (additive) dither signals and control techniques do not work satisfactorily for the case of a complex E/O converter 22 described above with reference to FIGS. 3a-c. A further complicating factor is that when the drive signals S(t) are high-resolution signals (i.e. exhibiting excursions between $2^M$ discrete states, wherein M>2) as in the embodiment of FIGS. 3a-c, conventional control loop techniques cannot distinguish between output optical signal variations due to the compensation function C[ ] from those produced by the dither signal.

Accordingly, methods and apparatus for cost-effectively controlling an optical transmitter to accurately synthesize a desired optical E-field waveform remains highly desirable.

SUMMARY OF THE INVENTION

Accordingly, an object of the present invention is to provide methods and apparatus for controlling a transmitter capable of synthesizing an arbitrary optical E-field waveform remains highly desirable.

Thus, an aspect of the present invention provides a method of synthesizing an optical signal. According to the present invention, a multi-bit digital representation of a desired optical E-field is generated. The multi-bit digital representation has a resolution of N1-bits, where N1 is an integer greater than 2. At least two analog drive signals are synthesized based on the multi-bit digital representation. Each analog drive signal exhibits excursions between $2^M$ discrete states (i.e. has a resolution of M-bits), where M is an integer greater than 2. An electrical-to-optical (E/O) converter is driven using the analog drive signals to generate an output optical E-field at an output of the E/O converter. An error is detected between the output optical E-field and the desired complex E-field waveform, and at least one parameter adjusted so as to minimize the detected error.

A further aspect of the present invention provides a method of controlling a non-linear analog optical transmitter comprising an electrical to optical (E/O) converter driven by a signal path having a multi-bit digital stage and an analog stage having at least one branch for generating a respective analog drive signal. In accordance with the present invention, a selected component of a signal traversing the signal path is dithered using at least one respective digital dither signal. At least one artefact of the at least one dither signal is detected in an optical signal at an output of the E/O converter. At least one parameter of the transmitter is then adjusted based on the detection result.

A still further aspect of the present invention provides a method of generating a dithered M-bit digital communications signal. According to the present invention, an $N_1$-bit signal is generated as a predetermined function of an N-bit communications signal and a dither signal, wherein a magnitude of a dither component of the $N_1$-bit signal corresponding to the dither signal is less than a predetermined scaling factor, and wherein at least one of N and $N_1$ is greater than M. The $N_1$-bit signal is divided by the predetermined scaling factor to generate a scaled signal, and the scaled signal quantized.

An advantage of the present invention is that accurate synthesis of a desired E-field at the E/O converter output can be obtained independently of device calibration.

BRIEF DESCRIPTION OF THE DRAWINGS

Further features and advantages of the present invention will become apparent from the following detailed description, taken in combination with the appended drawings, in which:

FIGS. 1a-1e schematically illustrate principal components and operation of an optical transmitter known in the prior art;

It will be noted that throughout the appended drawings, like features are identified by like reference numerals.

DETAILED DESCRIPTION OF THE PREFERRED EMBODIMENT

The present invention provides methods and apparatus for controlling a non-linear optical transmitter to accurately generate a desired optical E-field at the E/O converter output. Embodiments of the invention are described below, by way of example only, with reference to FIGS. 4-8.

Figure 3A:
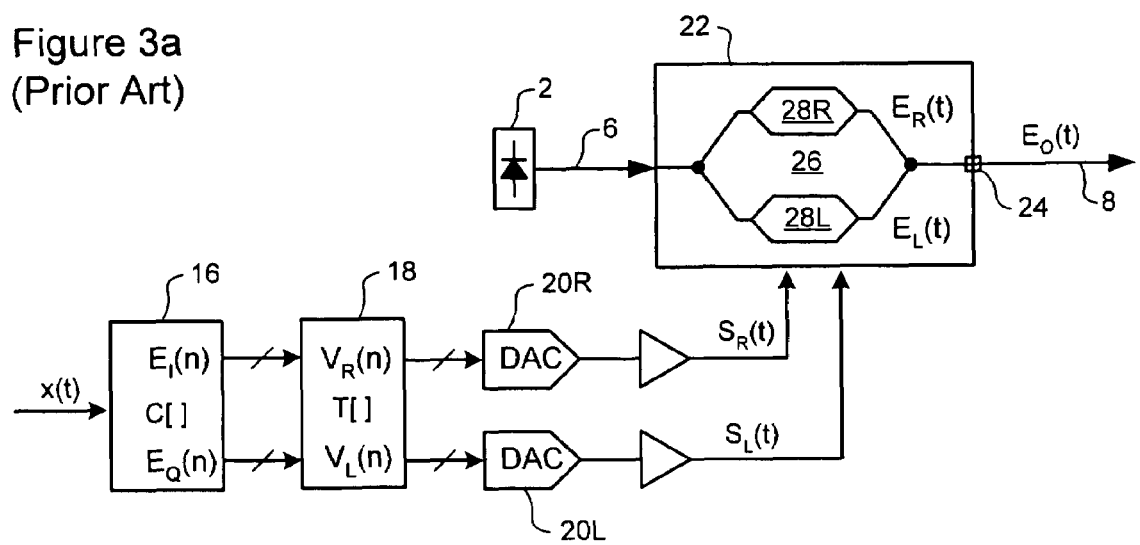
FIGS. 3a-3c schematically illustrates principal components of and operation of an optical transmitter implementing digital synthesis of an arbitrary complex optical E-field waveform, known from Applicant's co-pending U.S. patent applications Ser. No. 10/262,944, filed Oct. 3, 2002; Ser. No. 100/307,466 filed Dec. 2, 2002; and Ser. No. 10/405,236 filed Apr. 3, 2003, and International Patent Application No. PCT/CA03/01044 filed Jul. 11, 2003.
Figure 3B:
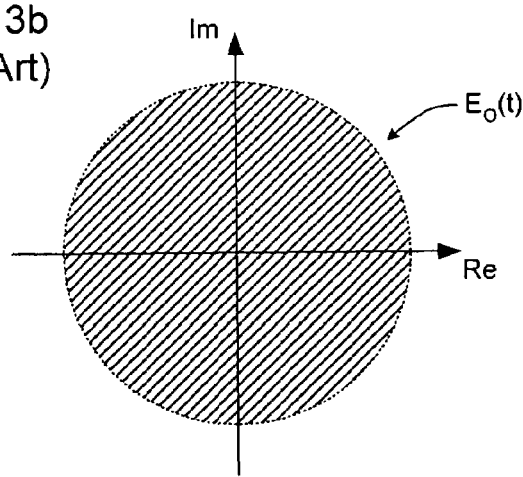
Figure 3C:
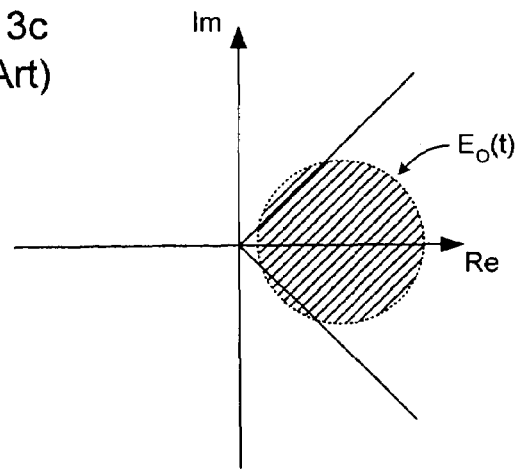
Figure 4:
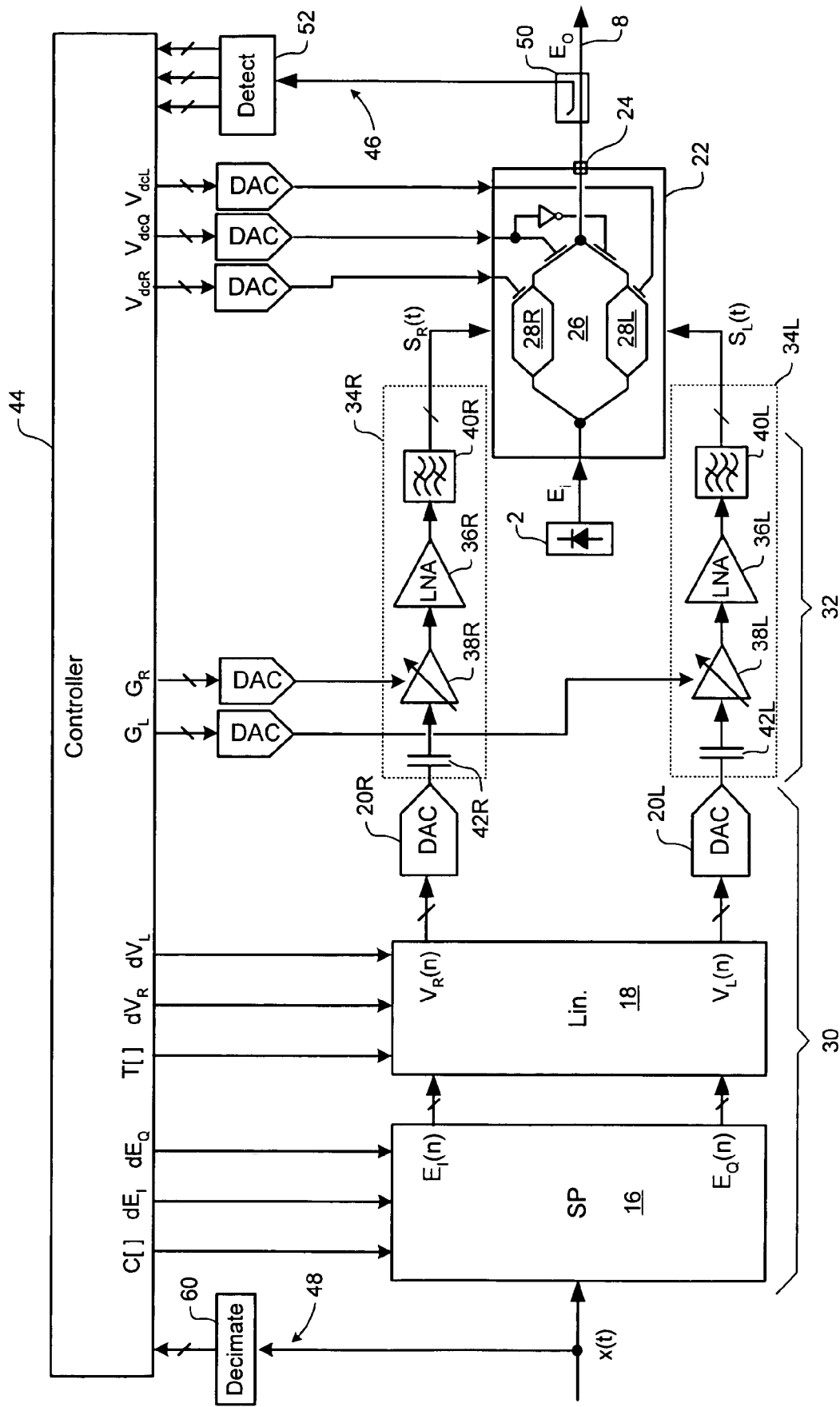
FIG. 4 schematically illustrates principal components and operation of a control system in accordance with an embodiment of the present invention, for controlling the optical transmitter of FIGS. 3a-3c.
Figure 5:
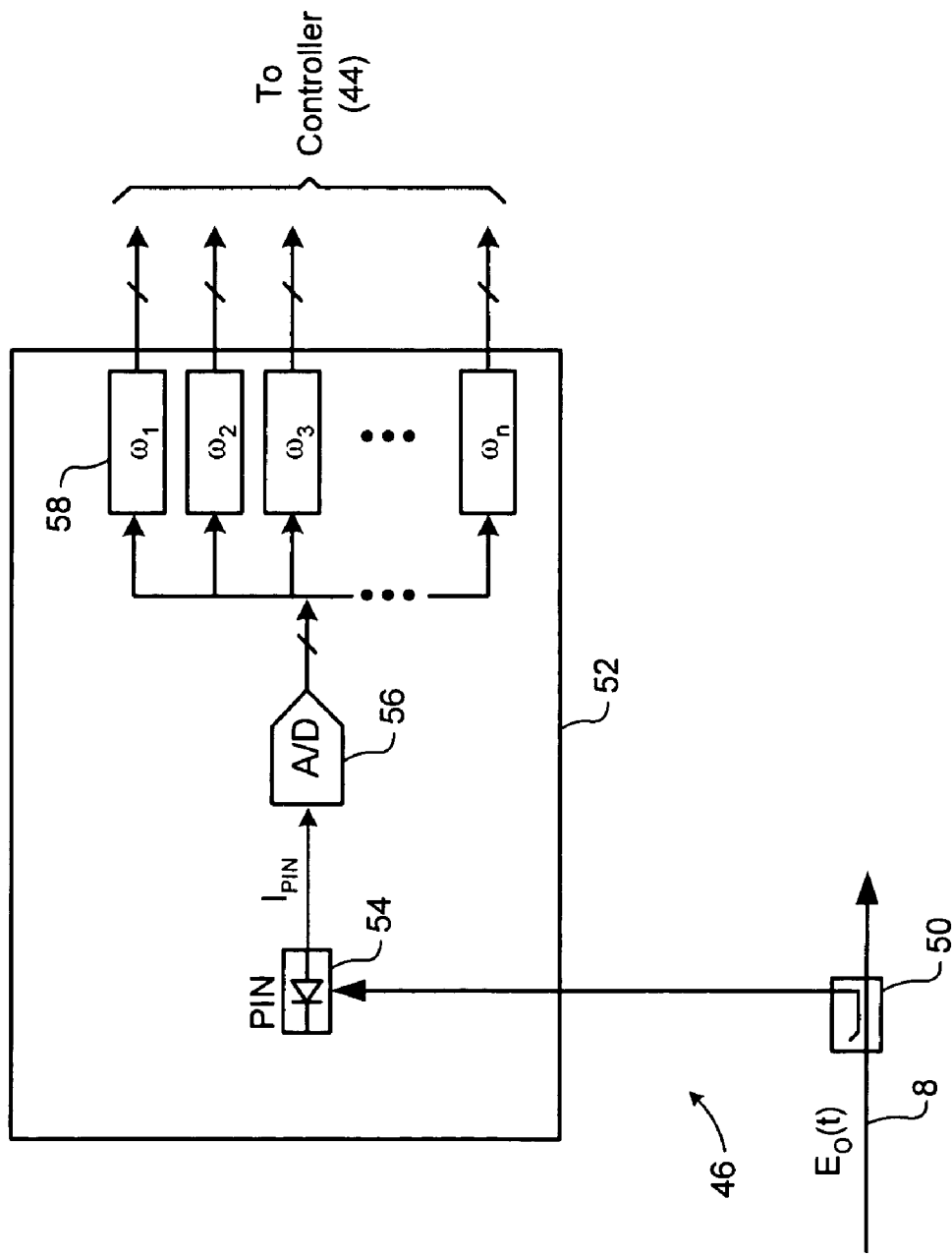
FIG. 5 illustrates a representative detector block usable in the control system of FIG. 4.

FIG. 4 is a block diagram schematically illustrating a control system in accordance with the present invention, for controlling a flexible non-linear optical transmitter of the type described above with reference to FIG. 3.

For the purposes of the present invention, it is useful to consider the transmitter as comprising a high speed "signal path" between the signal processor 16 and the output 24 of the complex E/O converter 22. This signal path comprises a high speed, multi-bit digital stage 30 cascaded with an analog radio-frequency (RF) stage 32, which, in turn, drives the complex E/O converter 22. As shown in FIG. 3a and in more detail in FIG. 4, the multi-bit digital stage 30 includes the signal processor 16, linearizer 18 and multi-bit DACs 20$x$, where x is an index identifying a respective branch of the signal path.

The analog stage 32 can usefully be considered as being divided into parallel branches 34, each of which comprises a (fixed gain) low-noise amplifier 36 and a variable gain amplifier (VGA) 38 to scale the DAC output and thereby generate a respective RF drive signal $S_x(t)$ (which will preferably be a differential drive signal pair $\pm S_x(t)$). If desired, each branch 34 may also include a band-pass filter 40 to attenuate out-of-band noise, and a DC-blocking capacitor 42 in order to prevent DC current drain from the DAC 20. Each RF drive signal $S_x(t)$ is supplied to a respective branch MZ interferometer 28$x$ of the complex E/O converter 22, so as to generate a corresponding branch optical signal $E_x(t)$. The branch optical signals $E_x(t)$ are combined at the E/O converter output 24 to produce the output optical signal $E_O(t)$ 8.

The high speed digital stage 30 of the signal path is preferably driven at a sample rate of at least double the expected bit rate of the input data signal x(t), in order to satisfy Nyquist's criteria for the input data signal x(t). This is primarily an operational consideration, which ensures that the output optical signal 8 will contain sufficient information to enable recovery of the input data signal x(t) at a receiver-end of the link. In principal, any sample rate may be used, although higher sample rates will be preferred. Each of the DACs 20$x$ is designed to provide digital-to-analog conversion at a resolution of M-bits, where (M) is greater than 2. The actual resolution chosen for the DACs is a balance between precision and cost. Increasing the number of bits resolution of the DACs 20$x$ improves the accuracy of synthesis of the output optical E-field $E_O(t)$, but also increases cost. In practice, a resolution of M=6 bits has been found to provide satisfactory precision without unnecessarily increasing costs.

In the embodiment of FIG. 4, the complex optical E/O converter 22 is provided by a dual branch "main" Mach-Zehnder (MZ) interferometer 26, having a respective "branch" MZ interferometer 28$x$ within each branch. Each of the branch MZ interferometers 28$x$ is independently driven by a respective one of the branch drive signals $S_x(t)$. The complex E/O converter 22 also includes a respective direct-current (DC) input port for each of the main and branch MZ interferometers 26,28$x$, each of which supplies a bias signal to its respective MZ interferometer.

It will be appreciated that the arrangement illustrated in FIG. 4 is suitable for implementing accurate synthesis of a desired output optical signal having a single polarization direction. However, the skilled artisan will recognise that this architecture can readily be extended to provide accurate optical synthesis in two orthogonal polarization directions. In a simple example, the entire signal path can be duplicated and run in parallel, with each signal path controlling a respective polarization direction. A preferred option, however, would be to utilize a single high speed digital stage 30 to compute digital drive signals $V_x(n)$ for both polarization directions. This enables the signal processor 16 and linearizer 18 to also control the polarization state of the output optical signal $E_O(t)$, which facilitates compensation of, for example, polarization mode dispersion and polarization dependent loss.

As shown in FIG. 4, a control system in accordance with an embodiment of the present invention comprises a controller unit 44, a feedback path 46 which samples the optical signal $E_O(t)$ at the E/O converter output 24, and a feed-forward path 48 which samples the input data signal x(t). In operation, the controller unit 44, which may be provided as any suitable combination of hardware and software, implements a set of parallel control loops for controlling a variety of parameters of the signal path, such as: the target optical E-field (via the compensation function C[ ]); the digital drive signals (via the linearizer transfer function T[ ]), RF stage path gain (via the VGAs), and E/O converter bias. Each control loop involves injecting one or more dither signals into the signal path; detecting artefacts of these dither signals within the output optical signal $E_O(t)$; using the detected artefacts to compute one or more cost-function values that are indicative of an error between the target E-field and the actual E-field of the output optical signal; and, based on the results of the cost-function calculations, adjusting one or more parameters of the signal path so as to optimize transmitter performance, and thereby minimize the error.

As shown in FIG. 4, the feedback path 4b comprises an optical coupler 50, such as a conventional 20 dB coupler for sampling the output optical signal, and a detector block 52 for detecting predetermined artefacts within the sampled optical signal. As may be seen in FIG. 5, the detector block 52 includes a P-Intrinsic-N (PIN) diode 54 which emits a current $I_{PIN}$ that is proportional to a power level of the sampled optical signal. The PIN diode output is sampled by an Analog-to-Digital A/D converter 56, and the sample values supplied to a set of normalized correlators 58, each of which is controlled, in a manner known in the art, to detect signal components of a respective predetermined frequency. The output of each normalized correlator is proportional to the power level of the detected signal components, and is supplied to the controller unit 44.

As will be described in greater detail below, low frequency components of the input data signal x(t) transiting the signal path can generate noise in a control loop. The feed-forward path 48 implements a decimation function 60 which approximates a time-integral of the input data signal x(t) over a predetermined period. This time integral provides information regarding the low-frequency content of the data signal x(t), and thus the noise in each control loop due to high speed data traversing the data path. This function enables the controller to estimate such low frequency components, and adjust the cost function computations accordingly.

Representative dither signals, cost functions, and control loops will now be described in greater detail with reference to FIGS. 6-8.

Dither Signals

For the purposes of the present invention, a "dither signal" can be any signal having a known frequency that is inserted into the signal path, and yields detectable artefacts in the output optical signal $E_O(t)$. These artefacts may take the form of optical power modulation at a frequency corresponding to one or more harmonics of a single dither, a beat of two or more dithers, and/or functions of these, as will be described in greater detail below.

The dither signal can be composed of any of: a pure tone (i.e. a sinusoidal signal); a modulated tone; or a digital signal, which may be periodic (e.g. a clock signal), pseudo-random, or may contain data (e.g. control channel signalling), and can be inserted at any suitable point into the signal path. Typically, the dither signal frequency will be selected to avoid overlap with other dither signals (and/or their harmonics), and to avoid interference with input data x(t) traversing the signal path. Dither frequencies of 1 MHz and below are preferred. Representative dithers that are contemplated in the present invention include:

(a) An E-field vector inserted at a selected phase offset (e.g. ±45°) to the target E-field or at a selected frequency offset from the target E-field (e.g. as a narrow sideband);

(b) A variation of the amplitude and/or phase of the target E-field, or, similarly, of the Real (Re) and imaginary (Im) components of the target E-field;

(c) An additive or multiplicative variation of one or both of the digital drive signals;

(d) Swapping between two or more different linearizer transfer functions T[ ];

(e) a sinusoidal or digital variation of the RF path gain, via the VGAs; and (f) sinusoidal or digital variation of the E/O converter bias.

Dithers a) and b) above can be implemented by suitable control of the signal processor 16, and in particular by suitable selection of the parameters of the compensation function C[ ].

Figure 6A:
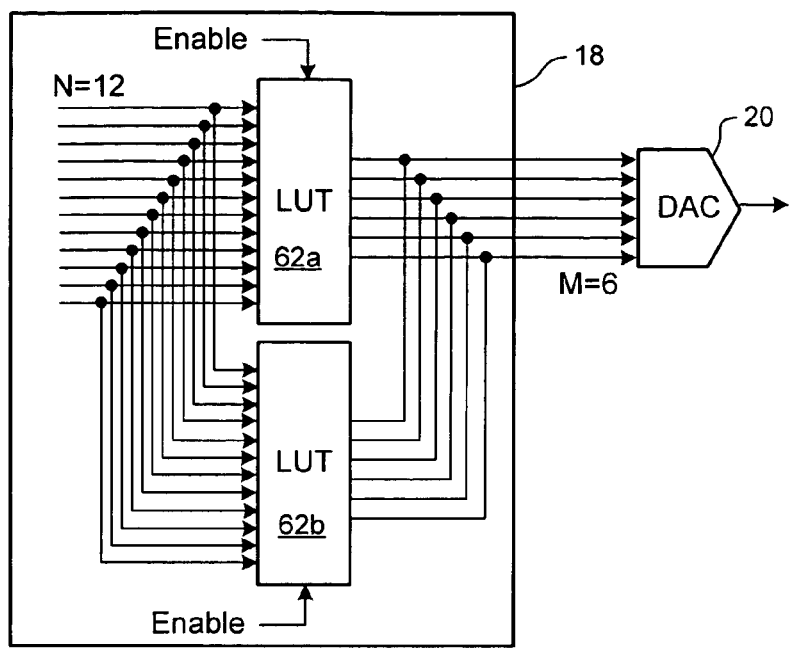
FIGS. 6a and 6b are block diagrams schematically illustrating respective embodiments of a linearizer of the optical transmitter of FIG. 4.
Figure 6B:
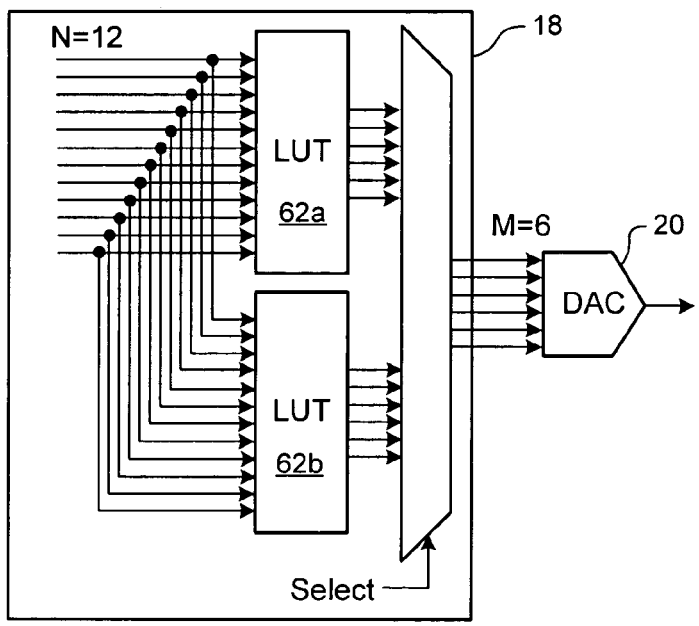

Dithers c) and d) above can be implemented in the linearizer 18. Additive and/or multiplicative variations of the digital drive signals $V_x(n)$ can be implemented by suitable selection of parameters of the linearizer transfer function T[ ]. It is worth noting that this operation can be implemented to independently insert dithers into the Re and Im components of the output optical signal $E_O(t)$. Since the dithers are orthogonal, the resulting artefacts in the output optical signal $E_O(t)$ will also be orthogonal, and thus will not interfere. Swapping between different transfer functions can be accomplished in various ways. For example, in embodiments in which the linearizer 18 is implemented as a Random-Access Memory Look-Up Table (RAM-LUT) 62, as shown in FIGS. 6a, 6b, it is a simple matter to provide two or more parallel RAM-LUTs, each implementing a respective different transfer function. The dither signal may then be injected into the data path by selectively enabling one of the RAM-LUTs, as shown in FIG. 6a, or alternatively by selecting the output of the one of the RAM-LUTs for further processing, as shown in FIG. 6b.

Dithers e) and f) are similar to conventional dithers, in that they are additive signals which vary the amplitude of the drive signals and/or bias signals in a conventional manner.

Specific dithers will be described below with reference to the control loops within which they are used. In all cases however, the dither signals share the following characteristics. Firstly, the frequency of each dither is selected so that its harmonics will not interfere with any other dither (or its harmonics), or with data. Secondly, in order to avoid corrupting the output optical E-field, the magnitude of the effect of each dither is preferably selected to be less than a least significant bit (LSB) of the DACs 20, at least during run-time.

In general, the insertion of such "sub-LSB" dithers is implemented by computing at least the digital drive signal values $V_R(n)$ and $V_L(n)$, including dithers, at a resolution of N bits, which is greater than the M-bit resolution of the DAC 20. The N-bit drive signal values $V_R(n)$ and $V_L(n)$ are then scaled, by dividing the computed value by a predetermined scaling factor, and then the scaling result quantized and clipped to an M-bit value that is supplied to the DAC input. For example, in embodiments in which each DAC 20 has an M=6 bit resolution, the digital drive signal values $V_x(n)$ can be computed at, for example, a resolution of N=12 bits, prior to scaling, quantization, and clipping, as shown in FIGS. 6 and 7.

As may be appreciated, the scaling, quantization, and clipping operations may be implemented in various ways. For example, these operations can be implemented as part of the linearizer transfer function T[ ], in which case these steps are purely logical, and may or may not be executed as discrete processing steps, as may be seen in FIGS. 6a and 6b. Alternatively, these operations can be implemented within the parallel data bus between the (N-bit) linearizer output, and the M-bit DAC input. An example of this latter approach is illustrated in FIG. 7.

Figure 7:
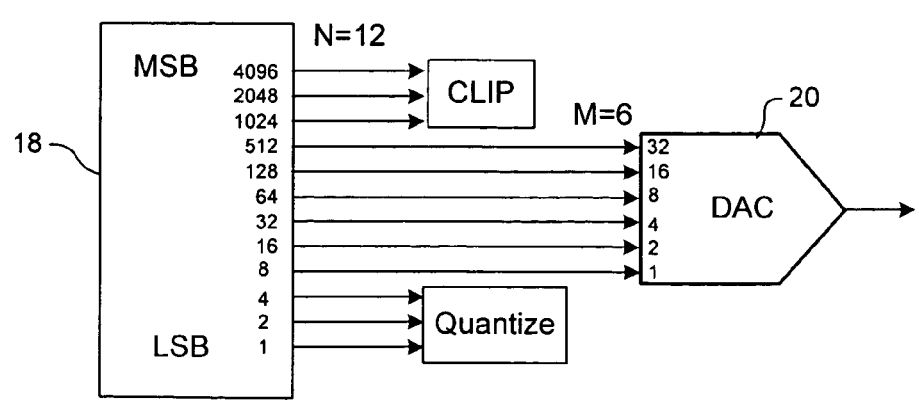
FIG. 7 is a block diagram schematically illustrating an embodiment of clipping and quantization function implemented within the optical transmitter of FIG. 4.

In the simplified example of FIG. 7, the linearizer 18 outputs an N=12 bit positive value (representing one of the drive signal values $V_x(n)$, for example). The scaling factor S is predetermined (and fixed) as the $m^{th}$ power of two. In the illustrated example, m=3, so that $S=2^3=8$. The scaling operation is thus implemented by selecting the $(m+1)=4^{th}$ bit of the linearizer output as the least significant bit supplied to the DAC 20, as shown in FIG. 7. Single-sided clipping and quantization can then be performed (in parallel) by truncating bits lying above the MSB and below the LSB of the DAC 20, respectively. If desired, the drive signal values $V_x(n)$ can by computed by the linearizer 18 with a fixed offset equivalent to ½ of the LSB of the DAC 20. This offset, in combination with the thresholding function of the DAC 20, converts the above quantization function (literally, truncation of bits lying below the LSB of the DAC 20) into a rounding operation.

It will be appreciated that FIG. 7 presents a simplified view for illustration purposes only. A more practical system will accommodate both positive and negative drive signal values $V_x(n)$, and double-sided clipping (i.e. clipping of both positive and negative excursions exceeding respective maximum and minimum) limits will be performed. It is considered that implementation of such a system, based on the teaching provided herein, will be well within the purview of those skilled in the art.

Applicant has found that, even when the sub-LSB bits are simply truncated (that is, without the ½-LSB offset), sub-LSB dithers within the computed drive signal values $V_x(n)$ still produce detectable artefacts within the output optical signal $E_O(t)$. This is attributed to the fact that the dither signal perturbs the probability distribution of the result of the thresholding function of the quantization in direct proportion to the magnitude of the dither. This is true even for very low level dither signal magnitudes, because each excursion of the low frequency dither affects a large number (potentially thousands) of successive drive signal values $V_x(n)$.

Cost Functions

As mentioned above, the controller unit 44 computes a cost function value which is indicative of an error between the actual output optical signal E-field $E_O(t)$ and the desired or target E-field. However, a low cost PIN detector 54 of the feed-back path 46 only detects optical power $|E(t)|^2$, so all phase information is lost. In addition, such a low cost PIN detector 54 will also tend to detect only the low-frequency portion of the optical signal E-field $E_O(t)$. Consequently, a direct comparison between actual and target E-fields is not possible, with a low cost, low speed PIN detector 54 of the type contemplated by the present invention. In addition, since the overall system response is dependent on many variables, such a direct comparison does not always provide useful information as to which parameter should be changed to remove any detected error.

Accordingly, the present invention provides cost functions which are indirectly indicative of features of the output optical E-field $E_O(t)$, and dependent on a parameter of the signal path. More particularly, each cost function defines an n-dimensional "control surface" which relates a set of one or more detectable artefacts of the output optical E-field $E_O(t)$ to a parameter of the signal path. The cost function value is controlled by adjusting the involved signal parameter, and is indirectly indicative of a respective feature of the output optical E-field $E_O(t)$. With this arrangement, desired features of the output optical E-field $E_O(t)$ can be obtained by progressively adjusting the parameter (e.g. in a step-wise manner) to drive the cost function to a predetermined value which corresponds with a desired feature of the output optical signal.

Representative optical signal features which can be controlled in this manner include, but are not necessarily limited to: spectral features such as carrier suppression; polarization state; and balance between the Re and Im components of the E-field $E_O(t)$.

Representative path parameters contemplated in the present invention include: the target optical E-field (via the compensation function C[ ]); the digital drive signals $V_x(n)$ (via the linearizer transfer function T[ ]), RF stage path gain (via the VGAs 38x), and bias points of the main and branch MZ interferometers of the complex E/O converter 22.

Preferably, cost functions are selected to be dependent upon a single parameter, so as to constrain degrees of freedom. In addition, cost functions are preferably defined in such a way as to be largely independent of device calibration. This may be accomplished through the formulation of the cost function itself and/or selection of a desired or target cost function value. For example, in some cases, the cost function can be formulated such that the desired optical E-field feature corresponds with a known value of the cost function, independently of device calibration. In other cases, the cost function can be formulated such that the desired optical E-field feature corresponds with a local maximum, minimum or zero of the cost function. The location of these points on the cost function control surface will normally be independent of device calibration, even though the actual value (in the case of maxima and minima) will not be.

In some cases, device calibration variables are known, or can be calculated, and used in computing the cost function. Computation of device calibration variables relies on the fact that insertion of the dither into the multi-bit digital stage 30 of the signal path enables high precision control over the dither signal. This precision enables a correspondingly precise calculation of at least some device calibration variables, such as, for example, the coupling efficiency of each branch MZ interferometer 28x (as will be described in greater detail below). Knowledge of device calibration variables in this manner (whether known in advance or calculated as described above) enables a path parameter to be controlled to yield a desired feature of the output optical signal which does not correspond with any of a maximum, minimum or zero of the cost function control surface.

In the following discussion, representative control loops are described, along with their associated dithers and cost functions.

Bias Control Loops

The purpose of the bias control loops is to drive each of the nested MZ interferometers 26,28x to respective optimum bias points, so as to achieve desired optical waveform characteristics. While various techniques are known for controlling the bias point of an individual MZ interferometer driven by a bi-state drive signal, it can be shown that these techniques will not work satisfactorily in the case of nested main and branch MZ interferometers of the type illustrated in FIG. 4. Nor will the conventional techniques work with an E/O converter (of any type) driven by high resolution drive signals $S_x(t)$ of the type contemplated in the present invention.

In accordance with the present invention, the bias control loop involves inserting a respective low frequency dither $dx=A_{dx} \cos(\omega_{dx} t)$ into each drive signal $V_x(t)$; detecting artefacts of the dithers in the output optical signal; using the detected artefacts to compute one or more cost function values; and then adjusting the bias voltage values $V_{dcR}$, $V_{dcL}$ and $V_{dcQ}$ to drive the cost functions to optimum values. It should be noted that the dither dx is characterized as a sinusoidal signal for convenience only. Any dither signal waveform may be used.

The dithers can be either additive or multiplicative, as desired, and may be inserted either by the linearizer, or by varying the gain of the respective RF signal path (i.e. via the VGAs). Preferably, the frequency $\omega_{dx}$ of each dither dx is selected to avoid overlap between respective harmonics of the two dithers.

The precise cost functions used, and the selected optimum values, will depend on the desired optical waveform characteristics of the output optical signal. In the following discussion, a representative quadrature control loop is described, followed by two example bias control loops for controlling the bias point of the branch MZ interferometers 28x. In example 1, the desired or target phase angle is known. In example 2, a desired feature of the output optical E-field is known, but the phase angles required to achieve it are not.

Quadrature Control Loop

Quadrature control involves controlling the bias point of the branch MZ interferometer 26 by adjusting the bias voltage $V_{dcQ}$. In this case a respective low frequency dither $dx=A_{dx} \cos(\omega_{dx} t)$ is inserted into each drive signal $V_x(t)$. Each dither dx produces artefacts in the output optical signal, which can be detected as amplitude modulation of the optical power $|E(t)|^2$ at a frequency $\omega_{beat}=|\omega_{dR}-\omega_{dL}|$ corresponding to a beat signal formed by the two dithers dx. The amplitude $H_{beat}$ of the beat component can be detected using a normalized correlator 58 in the detector block 52 of the feed-back path 46.

It can be shown that, at quadrature, the beat signal amplitude $H_{beat}$ goes to a minimum value (ideally zero), independently of the bias state of either of the branch MZ interferometers 28x. Accordingly, the beat signal amplitude $H_{beat}$ provides a useful cost function for controlling the bias voltage $V_{dcQ}$, and thereby unconditionally guaranteeing quadrature. It is a simple matter to implement a stepping function that incrementally adjusts the bias voltage $V_{dcQ}$ to drive the beat signal amplitude $H_{beat}$ to a minimum value (e.g. $H_{beat}=0$). Preferably, the bias voltages $V_{dcR}$ and $V_{dcL}$ are held constant during adjustment of bias voltage $V_{dcQ}$.

Known Target Phase Angle.

Figure 1A:
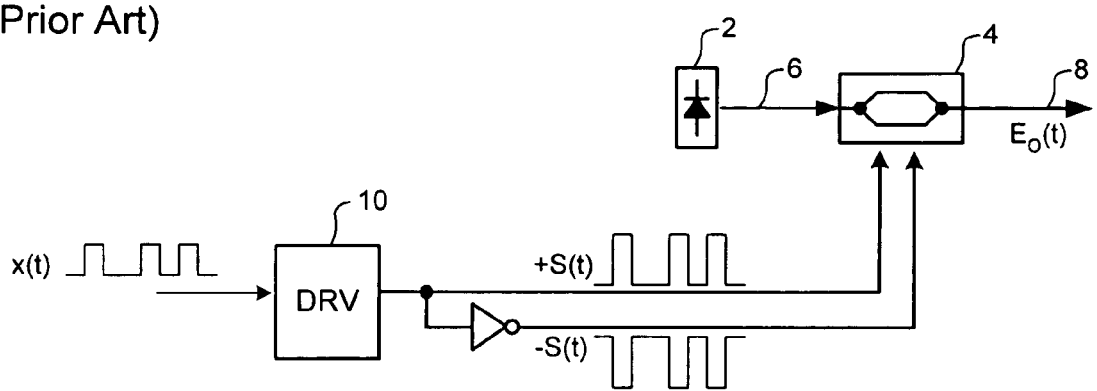
Figure 1D:
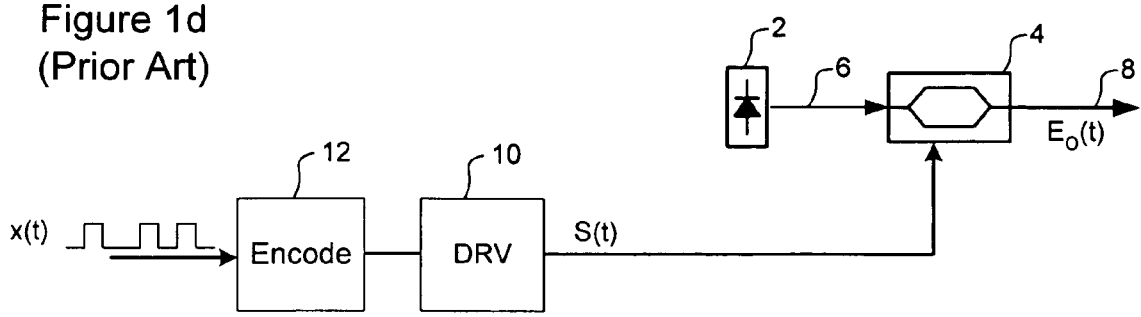
Figure 1E:
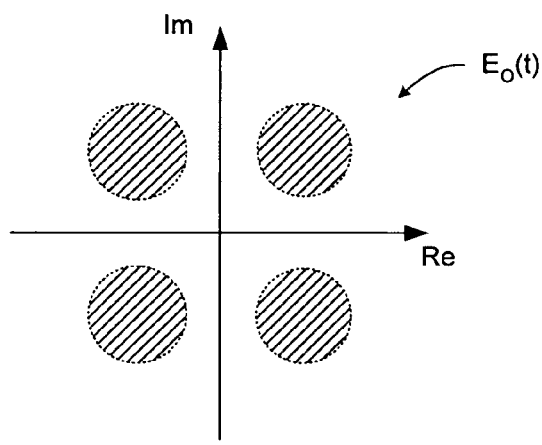
Figure 2:
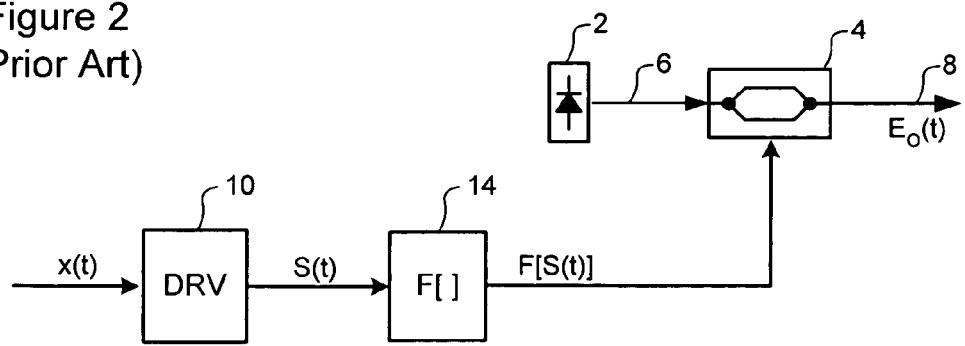
FIG. 2 schematically illustrates principal components of an optical transmitter implementing electrical precompensation of optical distortions known in the prior art.

In some cases, a target phase angle of $\theta_x$ of each branch MZ interferometer 28x is known, or can be computed in advance, and it is desired to control the actual phase angles to the applicable target value. For example, a dual branch MZ interferometer can be controlled to implement amplitude modulation by driving excursions of the amplitude response between maximum and minimum transmittance, as described above with reference to FIGS. 1a and 1b. In this modulation mode, it is desired to bias the MZ interferometer to an inflection point of its amplitude response curve, which corresponds to a phase angle of $\theta=\pi/2$. In the case of the nested MZ interferometers illustrated in FIG. 4, it is desired to implement this modulation scheme within each of the branch MZ interferometers 28x. Thus, each branch interferometer 28x is to be controlled to a phase angle of $\theta_x=\pi/2$. In this situation, the branch MZ interferometer 26 is assumed to be maintained in quadrature, using the method described above.

In addition to the beat signal component described above, the respective low frequency dither $dx=A_{dx}Cos(\omega_{dx}t)$ inserted into each drive signal $V_x(t)$ produces artefacts in the output optical signal $E_O(t)$ which can be detected as amplitude modulation of the optical power $|E(t)|^2$ at frequencies corresponding to the first through fourth harmonics of the respective dither frequency $\omega_{dx}$. The amplitude of each of these harmonics can be detected using conventional normalized correlators 58 in the detector block 52 of the feed-back path 46.

Based on the detected harmonic amplitudes, the coupling efficiency of each branch MZ interferometer 28x can be computed as either $$p_{tx} = \sqrt{\frac{-4!H_x2}{H_x1}} \text{ or } p_{tx} = \sqrt{\frac{-2(4!)H_x4}{H_x3}},$$

where $H_xn$ is the detected amplitude of the $n^{th}$ harmonic. With the coupling efficiency computed as above, the bias angle of the involved branch MZ interferometer 28x can be determined by $$\theta_x = \tan^{-1}\left(\frac{p_{tx}A_dH_x1}{4H_x3}\right).$$

It should be noted that this computation of the bias angle $\theta_x$ is entirely independent of device calibration, and therefore provides a useful cost function for controlling the bias voltages $V_{dcR}$ and $V_{dcL}$. It is a simple matter to implement a stepping function that incrementally adjusts each one of the bias voltages $V_{dcR}$ and $V_{dcL}$ to drive the respective bias angles of the branch MZ interferometers 28x to the desired phase angle (i.e. $\theta_x=\pi/2$)

Unknown Target Phase Angle

In some cases, the phase angle of $\theta_x$ of each branch MZ interferometer 28x is not known, or can not be computed in advance. For example, it may be desired to drive the complex E/O converter 22 to generate a carrier suppressed output optical signal $E_O(t)$. In this situation, it is desired to maximize the degree of carrier suppression, but the precise phase angles $\theta_x$ required to achieve this result may not be known. Here again, it is assumed that the main MZ interferometer 26 is maintained in quadrature, using, for example, the method described above.

It can be shown that, for a main MZ interferometer 26 at quadrature, suppression of the carrier is maximized when the amplitude of the first harmonics $H_R1$ and $H_L1$ (of the above-noted dithers) are minimized. Since the respective minima of the first harmonics $H_R1$ and $H_L1$ are artefacts of the optical E field, rather than the electro-optic transfer function of the E/O converter 22, this relationship is highly robust to physical device variations and the frequency dependency of the coupling efficiency. In addition, they are entirely independent of each other. Accordingly, the first harmonics $H_R1$ and $H_L1$ provide a useful cost function for controlling the bias voltages $V_{dcR}$ and $V_{dcL}$. It is a simple matter to implement a stepping function that incrementally adjusts the bias voltages $V_{dcR}$ and $V_{dcL}$ to drive the respective first harmonics $H_R1$ and $H_L1$ to a minimum value, and thereby achieve maximum carrier suppression.

Figure 8:
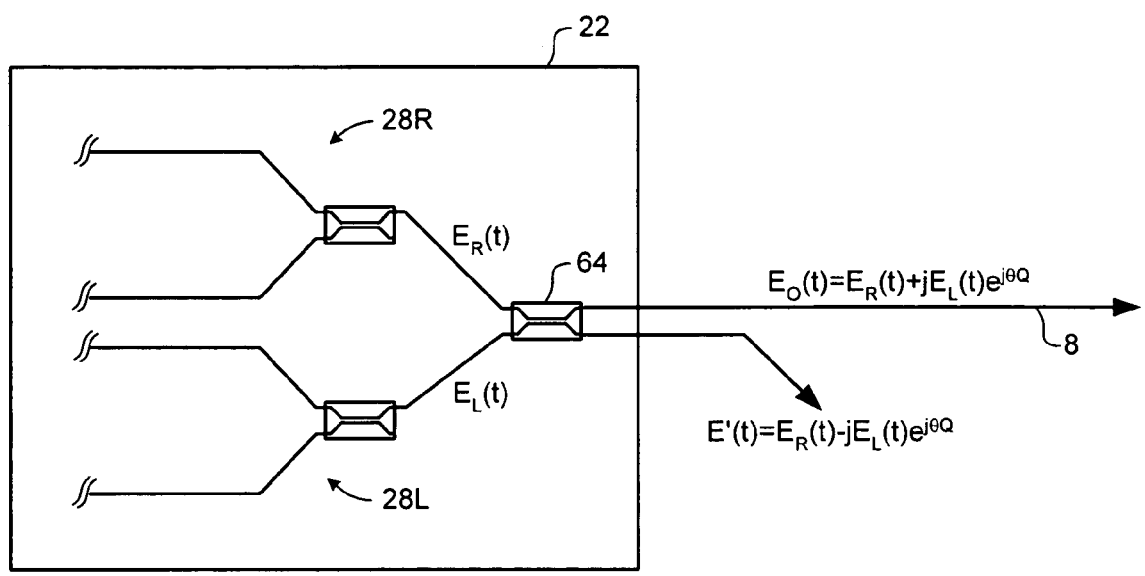
FIG. 8 is a block diagram illustrating a portion of the E/O converter of FIG. 4 in greater detail.

An alternative bias control loop can be implemented, utilizing the fact that, within the complex E/O converter 22, the respective branch signals $E_R(t)$ and $E_L(t)$ are combined using a signal combiner 68, as shown in FIG. 8. The combined optical signal $E(t)$ emerging from the complex E/O converter 22, and transmitted through an optical link as the communications signal 8 is the vector sum of the two branch signals, and may be described by an equation of the form $E(t)=E_R(t)+jE_L(t)e^{j\theta q}$ where $\theta q$ is the phase difference (angle) between $E_R(t)$ and $E_L(t)$. With this formulation, the optical power $|E(t)|^2$ sampled by the feedback path will be given by $|E(t)|^2=E_R(t)^2+E_L(t)^2-2E_R(t)E_L(t)\sin(\theta q)$ However, the signal combiner 64 also has a (normally unused) second output, which carries the vector difference of the two branch signals. This second output can be tapped and supplied to the controller unit 44 via a respective second feedback path (not shown). It will be noted that tapping this second output increases device costs due to the added waveguide, photodetector and detector block, but does not reduce the optical energy in the "main" signal transmitted through the link.

The optical signal appearing at the second output is $E'(t)=E_R(t)-jE_L(t)e^{j\theta q}$, and the respective optical power $|E'(t)|^2$ sampled by the second feedback path will be given by $|E'(t)|^2=E_R(t)^2-E_L(t)^2+2E_R(t)E_L(t)\sin(\theta q)$. Those of ordinary skill in the art will recognise that this second optical power sample can be used in conjunction with the above-noted dithering techniques to isolate desired terms, and measure the phase angles of the main and branch MZ interferometers 26,28x. For example, the bias voltage $V_{DCQ}$ can be driven to eliminate the mixing term $2E_R(t)E_L(t)\sin(\theta q)$ from both $|E(t)|^2$ and $|E'(t)|^2$, and the remaining terms manipulated to isolate and measure the phase angles $\theta_R$ and $\theta_L$ of the branch MZ interferometers 28x.

System Balance Control Loop

The purpose of the System Balance control loop is to ensure that the branches of the optical transmitter (i.e. between the linearizer 18 and the output 24 of the complex E/O converter 22) are balanced. In practice, this means that equal values of the digital drive signals $V_R(n)$ and $V_L(n)$ produce equal optical power levels of the two branch optical signals $E_R(t)$ and $E_L(t)$.

With the main and branch MZ interferometers 26,28x optimally biased as described above, any residual imbalance will be due to differences in the respective gains of the signal paths traversed by the drive signals between the linearizer 18 and the complex E/O converter 22, and the coupling efficiencies $p_{tx}$ of the branch MZ interferometers 28x.

The coupling efficiencies $p_{tx}$ of the branch MZ interferometers 28x can by computed using the methods described above. Since these computations are based on ratios of harmonic amplitudes, they are insensitive to path gain and E/O converter bias angle. Accordingly, it is possible to remove the effect of coupling efficiency $p_{tx}$ differences, and thereby isolate differences in the respective path gains $G_{px}$.

It can be shown that the ratio $$\left(\frac{H_x 2}{H_x 1}\right)$$

is directly proportional to $(p_{tx} S_{dx})$, where $S_{dx}$ is the peak amplitude of the dither $dx=A_{dx} \cos(\omega_{dx} t)$ received by the respective branch MZ interferometer $28x$. That is, $p_{tx} S_{dx} = p_{tx} G_{px} A_{dx}$, where $G_{px}$ is the path gain between the point of insertion of the dither signal dx and the complex E/O converter 22. For the case of a dither dx inserted upstream of the DACs $20x$ (i.e. by either the linearizer 18 or the signal processor 16), $G_{px}$ is the gain of the entire RF branch between the linearizer 18 and the complex E/O converter 22. In addition, if the respective peak amplitudes $A_{dR}$ and $A_{dL}$ of the two dithers $d_R$ and $d_L$ are equal, then $$\frac{(p_{tR} G_{pR} A_{dR})}{(p_{tL} G_{pL} A_{dL})} = \frac{(p_{tR} G_{pR})}{(p_{tL} G_{pL})} = \frac{\left(\frac{H_R 2}{H_R 1}\right)}{\left(\frac{H_L 2}{H_L 1}\right)},$$

which enables direct calculation of the system imbalance $$\frac{(p_{tR} G_{pR})}{(p_{tL} G_{pL})}$$

from the detected first and second harmonic amplitudes $H_x 1$ and $H_x 2$. Since this computation is based on ratios of the detected harmonic amplitudes, it is highly robust to device and path variations, as well as the frequency dependence of the coupling efficiency $p_{tx}$. It can also be shown that this computation is independent of the branch MZ interferometer bias angles $\theta_x$. Accordingly, it provides a useful cost function for controlling the VGA gains $G_R$ and $G_L$.

In this respect, it is useful to decompose the VGA gains $G_R$ and $G_L$ into common gain $G_{com}$ and relative gain $G_{rel}$, thus $G_R = G_{com} + G_{rel}$ and $G_L = G_{com} - G_{rel}$. Using this formulation, it is a simple matter to implement a stepping function that incrementally adjusts the relative gain $G_{rel}$ to drive the system imbalance $$\frac{(p_{tR} G_{pR})}{(p_{tL} G_{pL})}$$

to an optimum value (in this case $$\frac{(p_{tR} G_{pR})}{(p_{tL} G_{pL})} = 1\bigg),$$

and thereby achieve system balance. It can be shown that the relative gain $G_{rel}$ can be used to balance the branches 28 of the E/O converter 4 in this manner, independently of common gain setting, bias error, and even extinction ratio.

Common Gain Control Loop

The purpose of the Common Gain control loop is to optimize the overall system gain of the optical transmitter (i.e. between the signal processor 16 and the output 24 of the complex E/O converter 22). In practice, this means that a change in the phase and/or amplitude of the target E-field produces an equal change in the output optical E-field $E_O(t)$.

With the branches $34x$ of the transmitter properly balanced and the main and branch MZ interferometers $26, 28x$ optimally biased as described above, any residual error between the target and output optical E-field will be due the overall system gain of the optical transmitter between the signal processor 16 and the output 24 of the complex E/O converter 22. In this case a multiplicative low frequency binary (square wave) dither $d(m,\omega)$, where m is the amplitude and $\omega_d$ is the frequency, is applied to the amplitude A of the target E-field $E_T(t)$. Thus $E_T(t) \rightarrow (1+d)Ae^{j\omega_c t}$, where $\omega_c$ is the carrier frequency of the target optical E-field $E_T(t)$. The dither magnitude (m) may, for example, be 0.01.

The dither $d(m,\omega)$ produces artefacts in the output optical signal $E_O(t)$, which can be detected as amplitude modulation of the optical power $|E(t)|^2$ at the dither frequency $\omega_d$. The peak-to-peak amplitude $A_d$ of the dither component can be detected using a normalized correlator 58 in the detector block 52 of the feed-back path 46.

It can be shown that the ratio $$\left(\frac{A_d}{|E_O(t)|^2}\right)$$

is directly proportional on the overall system gain. It can also be shown that, as the difference between the target and output optical E-fields goes to zero, the value of this ratio approaches a unique value (i.e.

$$\left(\frac{A_d}{|E_O(t)|^2}\right) = 4m\bigg),$$

independently of device calibration. Accordingly, it provides a useful cost function for controlling the common gain $G_{com}$ component of the VGA gains $G_R$ and $G_L$. It is a simple matter to implement a stepping function that incrementally adjusts the common gain $G_{com}$ to drive $$\left(\frac{A_d}{|E_O(t)|^2}\right)$$

to the desired target value (i.e.

$$\left(\frac{A_d}{|E_O(t)|^2}\right) = 4m\right).$$

Feed-Forward Path

As mentioned above, the high speed data signal x(t) traversing the signal path appears a noise in each of the above-noted control loops. For the case of the low frequency dithers contemplated in the present application, the spectral content of the data signal x(t) lying at the extreme low-end of the frequency spectrum is of particular concern.

As shown in FIG. 4, the feed-forward path 48 comprises a decimation function 60, which counts the number of binary 1's in the high speed data signal x(t) during a predetermined time interval. This time interval may conveniently be selected to correspond with the period of a dither signal, but can be any desired number of bits. Since the high speed data signal x(t) is a serial binary signal, which steps between known voltage states, it will be appreciated that the integral over a selected time interval (i.e. number of bits) is directly proportional to the number of binary 1's and 0's received during that interval. Since the number of bits received during the interval is known, then this value can be determined by merely counting the number of binary 1's received during the interval in question.

In operation, the decimation function repeatedly counts the number of binary 1's received within successive time intervals. Each count value is stored in memory, which thereby produces a time sequence of values representing a filtered version of the input data signal x(t). This time sequence of values is then analyzed by the controller unit to extract low-frequency component information, for example by computing a Fast Fourier Transform (FFT). This information provides an estimate the contribution that the data signal x(t) makes to the harmonic and beat amplitudes detected by the normalized correlators 58 of the feedback path 46. This estimated contribution can then be subtracted from the detected harmonic and beat amplitudes, prior to computation of the respective cost function values used to drive each control loop.

It will be appreciated that the decimation function described above approximates a low-pass filter for extracting low-frequency components of the input data stream x(t). Those of ordinary skill in the art will recognise that, in principal, this filter function could be omitted entirely, and the input data stream x(t) evaluated directly to extract low frequency components. However, in cases where the input data stream x(t) has a data rate of more than a few Giga-bits per second, the necessary evaluation (i.e. FFT computation) demands an extremely fast (and thus expensive) processor.

In the foregoing description, each dither signal has a respective frequency, which enables the detector to isolate corresponding signal components in the output optical signal $E_O$. As will be appreciated, successful operation of the detector requires that the dither frequencies are selected to avoid interference between the dither signals and their respective harmonics. In general, this can be accomplished by selecting the dither frequencies such that no frequency corresponds to an harmonic of any other dither signal. In the case of symmetrical square-wave dither signals, only the odd harmonics need to be taken into account.

The embodiment(s) of the invention described above is (are) intended to be exemplary only. The scope of the invention is therefore intended to be limited solely by the scope of the appended claims.

We claim:

1. A method of synthesizing an optical signal, the method comprising steps of:
   generating a multi-bit digital representation of a desired optical E-field, the multi-bit digital representation having a resolution of N1-bits, where N1 is an integer greater than 2;
   synthesizing at least two analog drive signals based on the multi-bit digital representation, each analog drive signal having a resolution of M-bits, where M is an integer greater than 2;
   driving an electrical-to-optical (E/O) converter using the analog drive signals;
   detecting an error between an output optical E-field at an output of the E/O converter and the desired complex E-field waveform; and
   adjusting at least one parameter so as to minimize the detected error;
   wherein the step of detecting an error between the output optical E-field and the desired optical E-field comprises steps of:
      inserting at least one dither signal into a signal path of the analog drive signals, a magnitude of an effect of inserting the at least one dither signal being less than a least significant bit (LSB) of the analog drive signals;
      detecting at least one artefact of the at least one dither signal in the output optical E-field; and
      computing a value of a selected cost function using the detected artefacts.

2. A method as claimed in claim 1, wherein the multi-bit digital representation of the desired optical E-field comprises at least two streams of N1-bit digital values representing successive loci of an end-point of a desired optical E-field vector.

3. A method as claimed in claim 2, wherein the at least two streams of N1-bit digital values comprise any one of:
   respective In-phase and Quadrature values of the desired optical E-field;
   respective Phase and Amplitude values of the desired optical E-field; and
   a pair of digital values derivable from either one of the In-phase and Quadrature, and the Phase and Amplitude signals values of the desired optical E-field.

4. A method as claimed in claim 1, wherein N1>M.

5. A method as claimed in claim 4, wherein N1=12, and M=6.

6. A method as claimed in claim 1, wherein the step of synthesizing at least two analog drive signals comprises steps of:
   computing at least two N-bit (where N>M) digital drive signals based on at least the multi-bit digital representation of the desired optical E-field; and
   converting each N-bit digital drive signal into a corresponding analog drive signal using an M-bit Digital-to-Analog Converter (DAC).

7. A method as claimed in claim 6, wherein N≦N1.

8. A method as claimed in claim 6, further comprising steps of:
   scaling each N-bit digital drive signal; and
   clipping the scaling result to an M-bit integer value supplied to the DAC.

9. A method as claimed in claim 8, wherein the step of scaling each digital drive signal comprises a step of dividing each digital drive signal by $2^n$, where n is a selected integer.

10. A method as claimed in claim 8, further comprising a step of quantizing the scaling result.

11. A method as claimed in claim 10, wherein the step of quantizing the scaling result comprises a step of rounding a residual portion of the scaling result less than a Least Significant Bit (LSB) of the DAC to the nearest binary value equal to the LSB of the DAC.

12. A method as claimed in claim 10, wherein the step of quantizing the scaling result comprises a step of truncating a residual portion of the scaling result less than a Least Significant Bit (LSB) of the DAC.

13. A method as claimed in claim 8, wherein the step of clipping the scaling result comprises a step of:

if the scaling result is greater than an predetermined maximum value, setting the M-bit integer value equal to the predetermined maximum value; and otherwise, setting the M-bit integer value equal to the scaling result.

14. A method as claimed in claim 8, wherein the step of clipping the scaling result comprises a step of:

if the scaling result is less than an predetermined minimum value, setting the M-bit integer value equal to the predetermined minimum value; and otherwise, setting the M-bit integer value equal to the scaling result.

15. A method as claimed in claim 1, wherein the step of inserting at least one dither signal comprises inserting an additive or multiplicative dither into any one or more of:

a feature of the desired optical E-field;

a digital drive signal derived from the N1-bit digital representation of the desired optical E-field;

a gain of the signal path;

a bias voltage $V_{dc}$ of the E/O converter.

16. A method as claimed in claim 15, wherein the feature of the desired optical E-field comprises any one or more of:

a Cartesian coordinate component;

a polar coordinate component;

a polarization state;

a spectrum of the optical E-field.

17. A method as claimed in claim 15, wherein the gain of the signal path comprises any one or more of a common gain $G_{com}$ and a relative gain $G_{rel}$.

18. A method as claimed in claim 14, wherein the at least one artefact comprises any one or more of:

one or more respective harmonics of each dither signal; and a selected beat of two or more dither signals.

19. A method as claimed in claim 18, wherein each cost function is a selected function of one or more of the detected artefacts, which is dependent upon a respective parameter.

20. A method as claimed in claim 19, wherein the cost function defines a control surface which has either a maximum or a minimum corresponding to a desired feature of the output optical E-field, and wherein the step of adjusting at least one parameter comprises adjusting the respective parameter to drive a value of the cost function to the corresponding maximum or minimum.

21. A method as claimed in claim 19, wherein the cost function defines a control surface having a predetermined value which corresponds to a desired feature of the output optical E-field, and wherein the step of adjusting at least one parameter comprises adjusting the respective parameter to drive a value of the cost function to the predetermined value.

22. A method as claimed in claim 19, wherein the selected cost function is a branch bias angle $\theta_x$ calculated from any one or more of the first through fourth harmonics of a selected one dither signal, and the respective parameter is a bias voltage applied to a respective branch MZ interferometer of the E/O converter.

23. A method as claimed in claim 22, wherein the step of adjusting the at least one parameter comprises a step of adjusting the bias voltage to drive the branch bias angle $\theta_x$ to a predetermined value.

24. A method as claimed in claim 23, wherein the predetermined value is $\pi/2$.

25. A method as claimed in claim 19, wherein the selected cost function is a system balance $$\frac{(p_{tR}G_{pR})}{(p_{tL}G_{pL})}$$

between a pair of parallel branches, the system balance being calculated from respective first and second harmonics of dither signals inserted into each branch, and wherein the respective parameter is a relative gain of the branches.

26. A method as claimed in claim 25, wherein the step of adjusting the at least one parameter comprises a step of adjusting the relative gain to drive the system balance to a predetermined value.

27. A method as claimed in claim 26, wherein the predetermined value is 1.

28. A method as claimed in claim 19, wherein the selected cost function is a first harmonic of the dither signal which is indicative of carrier suppression of the output optical signal, and wherein the respective parameter is a bias voltage applied to a respective branch MZ interferometer of the E/O converter.

29. A method as claimed in claim 28, wherein the step of adjusting the at least one parameter comprises a step of adjusting the bias voltage to drive the respective first harmonic amplitude to a minimum.

30. A method as claimed in claim 19, wherein the selected cost function is an amplitude of a beat of two dither signals which is indicative of quadrature of the output optical signal, and wherein the respective parameter is a bias voltage applied to a branch MZ interferometer of the E/O converter.

31. A method as claimed in claim 30, wherein the step of adjusting the at least one parameter comprises a step of adjusting the bias voltage to drive the beat amplitude to a minimum.

32. A method of controlling a non-linear optical transmitter comprising an electrical to optical (E/O) converter driven by a signal path having a multi-bit digital stage and an analog stage having at least one branch for generating a respective analog drive signal, the method comprising steps of:

digitally dithering a selected component of a signal traversing the signal path using at least one respective digital dither signal;

detecting at least one artefact of the at least one dither signal in an optical signal at an output of the E/O converter; and adjusting at least one parameter of the transmitter based on the detection result;

wherein the digital stage of the signal path comprises a respective multi-bit Digital-to-Analog Converter (DAC) for sourcing an analog signal to each branch of the analog stage, the DAC having a resolution of M-bits, wherein M>2, and wherein a magnitude of an effect of digitally dithering a selected component of a signal traversing at least one branch is less than a least significant bit (LSB) of the DAC.

33. A method as claimed in claim 32, wherein the step of digitally dithering a selected component comprises a step of inserting an additive or multiplicative dither into any one or more of:

a feature of a desired optical E-field;

a digital drive signal derived from the desired optical E-field;

a gain of the analog stage of the signal path;

a bias voltage of the E/O converter.

34. A method as claimed in claim 33, wherein the feature of the desired optical E-field comprises any one or more of:

a Cartesian coordinate component;
a polar coordinate component;
a polarization state;
a spectrum of the optical E-field.

35. A method as claimed in claim 33, wherein the gain of the analog stage of the signal path comprises any one or more of a common gain $G_{com}$ and a relative gain $G_{rel}$.

36. A method as claimed in claim 32, wherein the digital stage comprises a linearizer adapted to implement at least two different transfer functions, and wherein the step of digitally dithering a selected component comprises a step of alternately selecting one of the transfer functions.

37. A method as claimed in claim 32, wherein the at least one artefact comprises any one or more of:
one or more harmonics of a respective dither signal; and
a selected beat of two or more dither signals.

38. A method as claimed in claim 32, wherein the step of adjusting at least one parameter of the transmitter comprises steps of:
calculating a cost function value based on the detected artefacts; and
adjusting the at least one parameter of the transmitter based on the calculated cost function value.

39. A method as claimed in claim 38, wherein each cost function is a selected function of one or more of the detected artefacts, which is dependent upon a respective parameter.

40. A method as claimed in claim 39, wherein the cost function defines a control surface which has either a maximum or a minimum corresponding to a desired feature of the output optical E-field, and wherein the step of adjusting at least one parameter comprises adjusting the respective parameter to drive a value of the cost function to the corresponding maximum, minimum, or zero.

41. A method as claimed in claim 39, wherein the cost function having a predetermined value which corresponds to a desired feature of the output optical E-field, and wherein the step of adjusting at least one parameter comprises adjusting the respective parameter to drive a value of the cost function to the predetermined value.

42. A method as claimed in claim 39, wherein the selected cost function is a branch bias angle $\theta_x$ calculated from the first through fourth harmonics of a selected one dither signal, and the respective parameter is a bias voltage applied to a respective branch MZ interferometer of the E/O converter.

43. A method as claimed in claim 42, wherein the step of adjusting the at least one parameter comprises a step of adjusting the bias voltage to drive the branch bias angle $\theta_x$ to a predetermined value.

44. A method as claimed in claim 43, wherein the predetermined value is $\pi/2$.

45. A method as claimed in claim 39, wherein the selected cost function is a system balance $$\frac{(p_{tR}G_{pR})}{(p_{tL}G_{pL})}$$

between a pair of parallel branches, the system balance being calculated from respective first and second harmonics of dither signals inserted into each branch, and wherein the respective parameter is a relative gain of the branches.

46. A method as claimed in claim 45, wherein the step of adjusting the at least one parameter comprises a step of adjusting the relative gain to drive the system balance to a predetermined value.

47. A method as claimed in claim 46, wherein the predetermined value is 1.

48. A method as claimed in claim 39, wherein the selected cost function is a first harmonic of the dither signal which is indicative of carrier suppression of the output optical signal, and wherein the respective parameter is a bias voltage applied to a respective branch MZ interferometer of the E/O converter.

49. A method as claimed in claim 48, wherein the step of adjusting the at least one parameter comprises a step of adjusting the bias voltage to drive the respective first harmonic amplitude to a minimum.

50. A method as claimed in claim 39, wherein the selected cost function is an amplitude of a beat of two dither signals which is indicative of quadrature of the output optical signal, and wherein the respective parameter is a bias voltage applied to a branch MZ interferometer of the E/O converter.

51. A method as claimed in claim 50, wherein the step of adjusting the at least one parameter comprises a step of adjusting the bias voltage to drive the beat amplitude to a minimum.

52. A method as claimed in claim 32, further comprising steps of:
estimating interference in the detection result due to a data signal traversing the signal path; and
compensating to at least partially mitigate an effect of the estimated interference.

53. A method as claimed in claim 52 wherein the step of estimating the interference comprises filtering the data signal to detect frequency components of the data signal in a frequency region corresponding to at least one harmonic of the digital dither signal.

54. A method as claimed in claim 53, wherein the step of filtering the data signal comprises a step of calculating a Fast Fourier Transform (FFT) of the data signal.

55. A method as claimed in claim 54, wherein the step of filtering the data signal comprises a step of estimating a time integral of the data signal over a predetermined period.

56. A method as claimed in claim 55, wherein the step of estimating the time integral comprises a step of counting a respective number of binary "1"s of the data signal within the predetermined period.

57. A method as claimed in claim 55, wherein the predetermined period corresponds with a period of the digital dither signal.

58. A method as claimed in claim 55, further comprising steps of:
storing time integral values estimated over respective successive periods as a time sequence of integral values; and
correlating the time sequence of integral values to the digital dither signal.

59. A method as claimed in claim 58, wherein the step of correlating the time sequence of integral values to the digital dither signal comprises a step of calculating a Fast Fourier Transform (FFT) over the time sequence of integral values.

60. A method as claimed in claim 52 wherein the step of estimating the interference comprises a step of correlating the input data signal with a function of the dither signal.

61. A method of generating a dithered M-bit digital communications signal, the method comprising steps of:
a linearizer generating an $N_1$-bit signal as a predetermined function of an N-bit communications signal and a dither signal, wherein a magnitude of a dither component of the $N_1$-bit signal corresponding to the dither signal is less than a predetermined scaling factor, and wherein at least one of N and $N_1$ is greater than M;

dividing the $N_1$-bit signal by the predetermined scaling factor to generate a scaled signal in which a magnitude of an effect of the dither signal is less than a Least Significant Bit (LSB) of the scaled signal; and quantizing the scaled signal to generate the dithered M-bit digital communications signal.

62. A method as claimed in claim 61, wherein the predetermined scaling factor is $2^n$, where n is a positive integer.

63. A method as claimed in claim 62, wherein the $N_1$-bit signal is a parallel binary signal, and wherein the step of dividing the $N_1$-bit signal comprises a step of selecting an (n+1)th bit of the $N_1$-bit signal as the LSB of the scaled signal.

64. A method as claimed in claim 63, wherein the step of quantizing the scaled signal comprises a step of truncating bits of the $N_1$-bit signal below the selected LSB of the scaled signal.

65. A method as claimed in claim 63, wherein the step of quantizing the scaled signal comprises steps of:
rounding a residual portion of the of the $N_1$-bit signal less than a Least Significant Bit (LSB) of the scaled signal to the nearest binary value equal to the LSB of the scaled signal; and
adding the rounding result to the scaled signal.

66. A method as claimed in claim 63, further comprising a step of clipping the quantization result to a predetermined maximum value.

67. A method as claimed in claim 66, wherein the predetermined maximum value is $(2^m-1)$, where m is a positive integer, and wherein the step of clipping the quantization result comprises a step of truncating bits of the $N_1$-bit signal above the (m+1)th bit of the quantization result.

68. A method as claimed in claim 61, wherein the predetermined function is either one of additive and multiplicative.

69. A method as claimed in claim 68, wherein the predetermined function is applied to a selected component of the N-bit communications signal.

70. A method as claimed in claim 69, wherein the selected component comprises any one or more of:
a feature of a desired optical E-field;
a digital drive signal derived from the desired optical E-field;
a gain of the analog stage of the signal path;
a bias voltage of the E/O converter.

71. A method as claimed in claim 70, wherein the component of the desired optical E-field comprises any one of:
a Cartesian coordinate component;
a polar coordinate component;
a polarization state;
a spectrum of the optical E-field.

72. A method as claimed in claim 70, wherein the gain of the analog stage of the signal path comprises any one or more of a common gain $G_{com}$ and a relative gain $G_{rel}$.

73. A method as claimed in claim 61, wherein the step of generating the $N_1$-bit signal comprises steps of:
the linearizer computing respective first and second values of the $N_1$-bit signal using respective different transfer functions; and
selecting an output of one of the transfer functions as a next value of the $N_1$-bit signal, based on the dither signal.

74. A method as claimed in claim 73, wherein the step of dividing the $N_1$-bit signal to generate the scaled signal is embedded within each transfer function.

75. A method as claimed in claim 73, wherein the step of quantizing the scaled signal is embedded within each transfer function.

76. A method as claimed in claim 75, wherein the step of quantizing the scaled signal comprises steps of:
rounding a residual portion of the scaling result less than a Least Significant Bit (LSB) to the nearest binary value equal to the LSB.

77. A method as claimed in claim 75, wherein the step of quantizing the scaled signal comprises a step of truncating a a residual portion of the scaling result less than a Least Significant Bit (LSB).

78. A method as claimed in claim 61, further comprising a step of clipping the scaling result to a predetermined maximum value.

79. A method as claimed in claim 78, wherein the step of clipping the scaling result comprises a step of, if the scaling result is greater than the predetermined maximum value, setting the scaling result equal to the predetermined maximum value.

80. A method as claimed in claim 78, wherein the step of clipping the scaling result comprises a step of, if the scaling result is less than a predetermined minimum value, setting the scaling result equal to the predetermined minimum value.

* * * * *